United States Patent [19]
Pelle

[11] Patent Number: 6,019,342
[45] Date of Patent: Feb. 1, 2000

[54] ANTIVIBRATION DEVICE

[75] Inventor: Thierry Pelle, Aze, France

[73] Assignee: Hutchinson, Paris, France

[21] Appl. No.: 09/065,870

[22] Filed: Apr. 24, 1998

[30] Foreign Application Priority Data

Apr. 28, 1997 [FR] France .................................. 97 05216

[51] Int. Cl.[7] .................................................. F16M 13/00
[52] U.S. Cl. .......................... 248/562; 248/560; 248/566; 248/570; 248/634
[58] Field of Search .................... 248/606, 634, 248/638, 560, 562, 566, 568, 569, 570, 603, 635

[56] References Cited

U.S. PATENT DOCUMENTS

| | | | |
|---|---|---|---|
| 4,986,510 | 1/1991 | Bellamy et al. ........................ | 248/562 |
| 5,549,283 | 8/1996 | Bellamy et al. .................... | 267/140.12 |
| 5,556,071 | 9/1996 | Bellamy et al. ........................ | 248/634 |
| 5,741,001 | 4/1998 | Bellamy et al. ........................ | 248/634 |
| 5,855,352 | 1/1999 | Bellamy et al. ........................ | 248/634 |

*Primary Examiner*—Derek J. Berger
*Assistant Examiner*—Dave Heisey
*Attorney, Agent, or Firm*—Marshall, O'Toole, Gerstein, Murray & Borun

[57] ABSTRACT

An antivibration device having two rigid strength members interconnected by an elastomer body has first and second abutments extending in parallel to limit relative movement between the two strength members along a determined axis and in a determined direction. The second abutment is less stiff than the first abutment, and it comes into contact with its corresponding counter-abutment before the first abutment comes into contact with its corresponding counter-abutment.

9 Claims, 1 Drawing Sheet

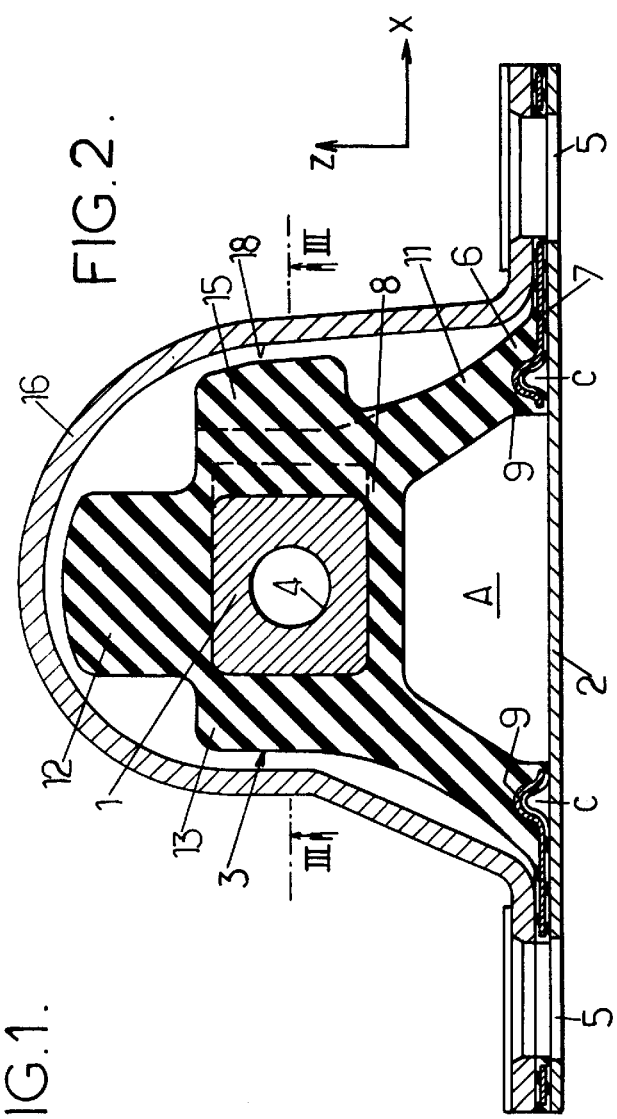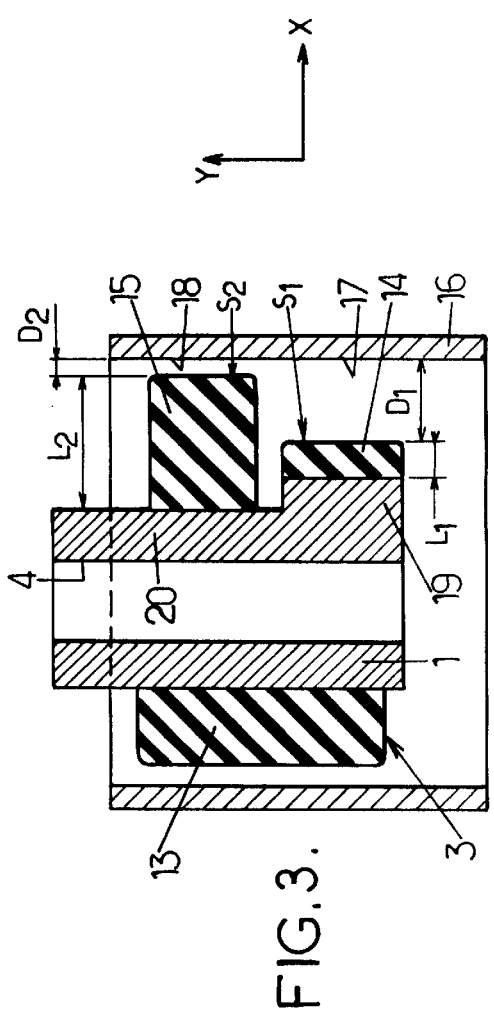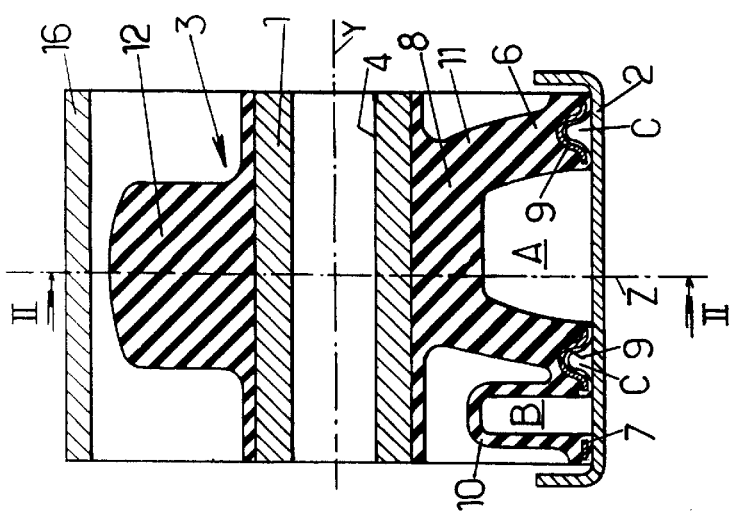

6,019,342

ANTIVIBRATION DEVICE

FIELD OF THE INVENTION

The present invention relates to antivibration devices.

More particularly, the invention relates to an antivibration device for interposing between two rigid elements to damp vibration between said two elements, the device comprising:

first and second rigid strength members suitable for securing respectively to the two rigid elements to be united;

an elastomer body interconnecting the two rigid strength members; and a first elastomer abutment secured to one of the two rigid strength members and adapted to come into contact with a first counter-abutment secured to the other of the two rigid strength members, to limit the displacement of the first strength member relative to the second strength member parallel to a determined axis in a determined direction, the first abutment being substantially undeformable perpendicularly to said axis, such that said first abutment substantially prevents any relative movement between the first and second strength members perpendicularly to said determined axis when said first abutment is in contact with the first counter-abutment, the first abutment normally being at a distance from the first counter-abutment.

BACKGROUND OF THE INVENTION

Such an antivibration device is disclosed in document EP-A-0 646 735, for example.

In normal operation, known antivibration devices of that type provide good damping and good filtering of relative vibratory motion between the two rigid elements united by such devices.

Nevertheless, because the first abutment of such a device must be very stiff to provide effective limitation of the motion of the first strength member relative to the second strength member, the performance of such a device deteriorates when said first abutment is held for some length of time in contact with the corresponding counter-abutment, for example during stages of vehicle acceleration or decceleration when the antivibration device is used to support the engine on the remainder of the structure of the vehicle.

Under such circumstances, the first abutment transmits vibration directly between the two rigid strength members.

OBJECTS AND SUMMARY OF THE INVENTION

A particular object of the present invention is to mitigate that drawback.

To this end, according to the invention, an antivibration device of the kind in question further comprises a second elastomer abutment different from the first abutment, secured to one of the two rigid strength members and adapted to come into contact with a second counter-abutment secured to the other of the two rigid strength members, also for limiting movement of the first strength member relative to the second strength member parallel to said determined axis and in said determined direction, the second abutment normally being spaced apart from the second counter-abutment, and being adapted to come into contact with said second counter-abutment before the first abutment comes into contact with the first counter-abutment when the first strength member moves relative to the second strength member and in said determined direction parallel to said determined axis, the second abutment being less stiff than the first abutment parallel to said determined axis, and the second abutment also presenting a certain amount of flexibility perpendicular to said determined axis to allow relative movement between the two rigid strength members perpendicular to said determined axis when said second abutment is in contact with the second counter-abutment, so long as the first abutment is not in contact with the first counter-abutment.

By means of these dispositions, relative motion between the first strength member and the second strength member is limited in most cases by the second abutment which is sufficiently flexible to avoid directly transmitting vibration between the first and second strength members, and it is only under exceptional circumstances that the first abutment comes into contact with the first counter-abutment.

In preferred embodiments of the invention, use may optionally be made of one or more of the following dispositions:

each of the first and second abutments presents a certain length parallel to said determined axis, a certain section perpendicular to said axis, and a certain slenderness ratio defined as being equal to said length divided by said section, the slenderness ratio of the second abutment being greater than the slenderness ratio of the first abutment;

the slenderness ratio of the second abutment is more than twice the slenderness ratio of the first abutment;

the first and second abutments are both secured to the first strength member, the first and second counter-abutments both being secured to the second strength member;

the first and second counter-abutments are constituted by two adjacent zones belonging to a common surface substantially perpendicular to the determined axis, the first strength member including first and second portions from which the first and second abutments extend respectively towards the first and second counter-abutments, said first and second portions of the first strength member being separated from the first and second counter-abutments respectively by first and second distances, and said first distance being smaller than said second distance;

the antivibration device is adapted to damp vibration between the two rigid strength members essentially in a main vibration direction which is perpendicular to said determined axis;

the elastomer body has a thick wall interconnecting the two rigid strength members and defining at least a part of a first hydraulic chamber filled with liquid, the antivibration device further comprising:

a deformable second hydraulic chamber also filled with liquid; and a narrow passage filled with liquid and interconnecting the first and second hydraulic chambers;

the antivibration device is adapted to damp vibration between two rigid strength members essentially in a main vibration direction, the elastomer body including a freely deformable thin wall defining a portion of the second hydraulic chamber, the second strength member being constituted by a plate which is substantially perpendicular to the main vibration direction and which presents a face that is secured in sealed manner to the elastomer body to co-operate therewith to define the two hydraulic chambers and the narrow channel; and the first and second abutments are secured to the first strength member, the first and second counter-abutments being constituted by adjacent zones belonging to a sheet metal cover which covers the elastomer body at least in part and which is secured to the second strength member.

BRIEF DESCRIPTION OF THE DRAWING

Other characteristics and advantages of the invention appear from the following description of an embodiment, given by way of non-limiting example and with reference to the accompanying drawing.

In the drawing:

FIG. 1 s a vertical section view through an antivibration device constituting an embodiment of the invention;

FIG. 2 is a section view on line II—II of FIG. 1; and

FIG. 3 is a section view on line III—III of FIG. 2;

MORE DETAILED DESCRIPTION

In the various figures, the same references are used to designate elements that are identical or similar.

In the embodiment of the invention shown in the drawings, the antivibration device is a hydraulic support comprising first and second rigid metal strength members 1 and 2 which are interconnected by an elastomer body 3 and which are designed to be interposed between two rigid elements (not shown) for damping and connection purposes.

The first strength member 1 is designed to be secured to the load that is to be carried, for example a vehicle power unit. In this example, the first strength member is in the form of a hollow elongate member having a central bore 4 to which the load to be carried is secured and which extends longitudinally along a substantially horizontal axis Y.

The second strength member 2 is a plate that is generally plane, at least in part, and that is designed to be fixed in general to the structure of a vehicle, e.g. via fixing holes 5 (FIG. 2).

The second strength member 2 extends perpendicularly to an axis Z, which in the present case is vertical and represents the main direction of the vibrations to be damped.

The elastomer body 3 has a relatively wide base 6 which is secured in sealed manner to the second strength member 2, in particular by means of a perforated metal plate 7 which is embedded in said base and which may present tabs (not shown) that are crimped on the edges of the second strength member 2.

From its base 6, the elastomer body extends upwards parallel to the axis Z, converging on a top 8 in which the first strength member 1 is partially embedded, and which is secured to said first strength member by vulcanization.

In the bottom face of the base 6 of the elastomer body which is applied in sealed manner against the second strength member 2, there are formed two cavities constituting respectively a working chamber A disposed beneath the first strength member 1 and a compensation chamber B disposed remotely from said first strength member.

In addition, in the bottom face of the base 6 of the elastomer body there is also formed a groove of shape that is preferably defined, at least in part, by a stamping 9 in the perforated plate 7, said groove constituting a narrow channel C permanently interconnecting the above-mentioned chambers A and B.

The assembly constituted by the working chamber A, the compensation chamber B, and the narrow channel C is closed in sealed manner by the second strength member 2, and this assembly is filled with a liquid that can flow between the chambers via the narrow channel for the purpose of damping vibratory motion between the two strength members 1 and 2.

In order to enable liquid to be transferred from one chamber to the other, the elastomer body 3 is shaped so that the compensation chamber B is defined by a wall 10 of said body which is relatively thin and flexible, while the working chamber A is itself defined by a relatively thick wall 11 of the body 3, said thick wall interconnecting the strength members 1 and 2 and being adapted to take up a static load lying in the range 1000 Newtons (N) to 1500 N, or possibly even more.

The elastomer body 3 also has projections 12–15 which are adapted to limit displacement of the first strength member 1 by coming into abutment against a sheet metal plate 16 in the form of an arch which is secured to the second strength member 2 and which forms a rigid cover that covers the elastomer body 3, at least in part.

Amongst these various projections, the invention relates more particularly to the projections 14 and 15 which respectively constitute a first abutment and a second abutment and which project from the first strength member 1 parallel to each other along a horizontal axis X that is perpendicular to the above-mentioned axes Y and Z.

These two elastomer projections 14 and 15 are adapted to come into abutment against respective first and second adjacent counter-abutment zones 17 and 18 belonging to a surface that is substantially perpendicular to the axis X and that forms a part of the inside face of the arch 16.

Elastomer projection 14 extends over a short thickness or length L1 parallel to the axis X, e.g. about 0.5 cm, and said projection 14 is of relatively large section S1 perpendicular to said axis X, e.g. having an area of about 5 cm$^2$.

The projection 14 thus presents a small slenderness ratio L1/S1 parallel to the axis X, e.g. of about 0.1 cm$^{-1}$, such that this projection 14 is very stiff along the axis X.

In addition, because of its small slenderness ratio, the projection 14 is substantially undeformable perpendicularly to the axis X. This projection 14 thus substantially prevents, or at least greatly limits, any movement of the first strength member 1 perpendicularly to the axis X when said projection is in abutment against the corresponding counter-abutment zone 17, given the friction that then exists between the projection 14 and the counter-abutment zone 17.

When the antivibration support is in its rest position, the projection 14 is situated at a distance D1 from the corresponding counter-abutment 17, with the projection 14 preferably being formed on a projecting portion 19 projecting from the first strength member 1 and extending parallel to the axis X towards the counter-abutment zone 17.

The elastomer projection 15 extends from a zone 20 of the first strength member 1 which is further away from the arch 16 than is the zone 19 from which the elastomer projection 14 extends. The length L2 of the elastomer projection 15 parallel to the axis X is greater than L1, the length L2 possibly being about 2 cm, for example, and the free end of the projection 15 is at a distance D2 from the corresponding counter-abutment zone 18 that is smaller than the distance D1.

In addition, perpendicularly to the axis X, the projection 15 is of section S2 that may be about 5 cm$^2$, for example, such that the slenderness ratio L2/S2 of the projection 15 parallel to the axis X is relatively large, e.g. being about 0.4 cm$^{-1}$.

As a result, the projection 15 is much more flexible than is the projection 14, both parallel to the axis X and perpendicular thereto, such that:

- this projection provides much more gradual limiting than does the projection 14 of the motion to which the first strength member 1 is subject parallel to the axis X towards the counter-abutment zone 18; and
- said projection 15 also makes it possible for the strength member 1 to move parallel to the axes Y and Z when the projection is pressed against the arch 16.

Thus, in normal operation of the vehicle, e.g. while said vehicle is accelerating, the projection 15 comes into abutment against the corresponding counter-abutment zone 18, but this abutment is flexible, such that the projection 15 does not transmit engine vibration directly to the structure of the vehicle.

In addition, the projection 15 then allows the hydraulic antivibration support to continue to operate normally, since the first strength member 1 can still move parallel to the axis Z, thereby causing the liquid to be transferred between the working chamber A and the compensation chamber B via the narrow channel C, thus enabling the particularly effective damping characteristics of a hydraulic antivibration support to be conserved.

The projection 14 comes into contact with the corresponding counter-abutment zone 17 only very rarely, under extreme operating conditions in which questions of transmitting vibration between the strength members 1 and 2 become of minor importance, with the projection 14 then serving essentially for safety purposes to prevent the first strength member 1 moving too far.

Naturally, the invention is not limited to the particular embodiment described above, and in particular it covers variants in which:

- the hydraulic chambers of the antivibration device are disposed in different manner to the chambers described above;
- the antivibration device is oriented in such a manner that its axis Z is not vertical;
- the antivibration device interconnects two rigid elements other than the engine and the structure of a vehicle;
- the antivibration device includes one or more pairs of elastomer abutments similar to the above-described projections 14 and 15, at least some of these pairs of abutments being disposed to limit relative movement between two rigid strength members 1 and 2 along axes other than the axis X, and/or along the axis X, but in the opposite direction to the limiting performed by the projections 14 and 15;
- the antivibration device serves only to provide a connection between two rigid elements without also serving as a support; and
- the antivibration device does not include hydraulic chambers or a narrow passage.

We claim:

1. Antivibration device for interposing between two rigid elements to damp vibration between said two elements, the device comprising:

first and second rigid strength members suitable for securing respectively to the two rigid elements to be united;

an elastomer body interconnecting the two rigid strength members; and a first elastomer abutment secured to one of the two rigid strength members extending parallel to a determined axis up to a first abutment end which faces a first counter-abutment secured to the other of the two rigid strength members, said first abutment end being adapted to come into contract with said first counter abutment to limit the displacement of the first strength member relative to the second strength member parallel to said determined axis in a determined direction of movement of the first rigid strength member relative to the second strength member, the first abutment being substantially undeformable perpendicularly to said axis, such that said first abutment substantially prevents any relative movement between the first and second strength members perpendicularly to said determined axis when said first abutment is in contact with the first counter-abutment, the first abutment normally being at a distance from the first counter-abutment, said antivibration device further comprising a second elastomer abutment different from the first abutment, secured to one of the two rigid strength members extending parallel to said determined axis up to a second abutment end which faces a second counter-abutment secured to the other of the two rigid strength members, said second abutment end being adapted to come into contact with said second counter-abutment to limit movement of the first strength member relative to the second strength member parallel to said determined axis and in said determined direction of movement of the first rigid strength member relative to the second strength member, the second abutment normally being spaced apart from the second counter-abutment, and being adapted to come into contact with said second counter-abutment before the first abutment comes into contact with the first counter-abutment when the first strength member moves relative to the second strength member and in said determined direction parallel to said determined axis, the second abutment being less stiff than the first abutment parallel to said determined axis, and the second abutment also presenting a certain amount of flexibility perpendicular to said determined axis to allow relative movement between the two rigid strength members perpendicular to said determined axis when said second abutment is in contact with the second counter-abutment, so long as the first abutment is not in contact with the first counter-abutment.

2. An antivibration device according to claim 1, in which each of the first and second abutments presents a certain length parallel to said determined axis, a certain section perpendicular to said axis, and a certain slenderness ratio defined as being equal to said length divided by said section, the slenderness ratio of the second abutment being greater than the slenderness ratio of the first abutment.

3. An antivibration device according to claim 2, in which the slenderness ratio of the second abutment is more than twice the slenderness ratio of the first abutment.

4. An antivibration device according to claim 1, in which the first and second abutments are both secured to the first strength member, the first and second counter-abutments both being secured to the second strength member and extending parallel to said determined axis in said determined direction of movement of the first rigid strength member relative to the second strength member.

5. An antivibration device according to claim 4, in which the first and second counter-abutments are constituted by two adjacent zones belonging to a common surface substantially perpendicular to the determined axis, the first strength member including first and second portions from which the first and second abutments extend respectively towards the first and second counter-abutments, said first and second portions of the first strength member being separated from the first and second counter-abutments respectively by first and second distances, and said first distance being smaller than said second distance.

6. An antivibration device according to claim 1, adapted to damp vibration between the two rigid strength members essentially in a main vibration direction which is perpendicular to said determined axis.

7. An antivibration device according to claim 1, in which the elastomer body has a thick wall interconnecting the two rigid strength members and defining at least a part of a first hydraulic chamber filled with liquid, the antivibration device further comprising:
- a deformable second hydraulic chamber also filled with liquid; and
- a narrow passage filled with liquid and interconnecting the first and second hydraulic chambers.

8. An antivibration device according to claim 7, adapted to damp vibration between two rigid strength members essentially in a main vibration direction, the elastomer body including a freely deformable thin wall defining a portion of the second hydraulic chamber, the second strength member being constituted by a plate which is substantially perpendicular to the main vibration direction and which presents a face that is secured in sealed manner to the elastomer body to co-operate therewith to define the two hydraulic chambers and the narrow channel.

9. An antivibration device according to claim 8, in which the first and second abutments are secured to the first strength member, the first and second counter-abutments being constituted by adjacent zones belonging to a sheet metal cover which covers the elastomer body at least in part and which is secured to the second strength member.

* * * * *